United States Patent
Bennett

(10) Patent No.: US 11,304,177 B2
(45) Date of Patent: Apr. 12, 2022

(54) SYSTEM FOR ACCURATE LOCATION ESTIMATION OF A WATER VESSEL

(71) Applicant: i911 International, Inc., Hallandale Beach, FL (US)

(72) Inventor: Christopher Ryan Bennett, St. Petersburg, FL (US)

(73) Assignee: i911 International, Inc., Hallandale Beach, FL (US)

( * ) Notice: Subject to any disclaimer, the term of this patent is extended or adjusted under 35 U.S.C. 154(b) by 31 days.

(21) Appl. No.: 16/998,353

(22) Filed: Aug. 20, 2020

(65) Prior Publication Data

US 2022/0061018 A1 Feb. 24, 2022

(51) Int. Cl.
  *H04W 64/00* (2009.01)
  *G06K 9/62* (2022.01)
  *H04W 4/029* (2018.01)
  *G06N 20/00* (2019.01)
  *H04W 4/14* (2009.01)

(52) U.S. Cl.
  CPC ........ *H04W 64/006* (2013.01); *G06K 9/6256* (2013.01); *G06N 20/00* (2019.01); *H04W 4/029* (2018.02); *H04W 4/14* (2013.01); *H04W 64/003* (2013.01)

(58) Field of Classification Search
  CPC ..... H04W 64/006; H04W 4/029; H04W 4/14; H04W 64/003; G06N 20/00; G06K 9/6256
  See application file for complete search history.

(56) References Cited

U.S. PATENT DOCUMENTS

| | | |
|---|---|---|
| 9,307,430 B1 | 4/2016 | Shah et al. |
| 2007/0298765 A1 | 12/2007 | Dickinson et al. |
| 2010/0003958 A1 | 1/2010 | Ray et al. |
| 2013/0222142 A1 | 8/2013 | Marshall |
| 2013/0317944 A1* | 11/2013 | Huang ............... G06Q 30/0623 705/26.61 |
| 2016/0071398 A1 | 3/2016 | Boss et al. |
| 2016/0192166 A1 | 6/2016 | deCharms |

(Continued)

OTHER PUBLICATIONS

International Search Report and Written Opinion, PCT Application No. PCT/US2021/043696, dated Nov. 12, 2021, 39 pages.

(Continued)

*Primary Examiner* — Curtis B Odom
(74) *Attorney, Agent, or Firm* — Fenwick & West LLP

(57) ABSTRACT

A system and a method are disclosed for enabling accurate estimation of a location of a water vessel. In an embodiment, a rescue system transmits a Short Message Service (SMS) message to a user device on the water vessel, the SMS message comprising a selectable option that, when selected, causes a location of the user device to be shared. Based on a selection by a user of the user device of the selectable option, the system receives a plurality of location coordinates from the user device at a plurality of respective times, each respective location coordinate describing a respective location of the user device at its respective time. The system computes an estimated location of the water vessel based on the plurality of location coordinates and an elapsed time between a current time and a time at which a last-received location coordinate was received. The system transmits the estimated location to a responder device.

20 Claims, 10 Drawing Sheets

(56) References Cited

U.S. PATENT DOCUMENTS

2017/0303090 A1 10/2017 Stitt et al.
2018/0093637 A1 4/2018 Piccioni
2020/0184828 A1 6/2020 Mazor et al.

OTHER PUBLICATIONS

United States Office Action, U.S. Appl. No. 16/998,375, dated Aug. 17, 2021, 34 pages.

* cited by examiner

600

602
transmit a Short Message Service (SMS) message to a user device on a water vessel, the SMS message comprising a selectable option that, when selected, causes a location of the user device to be shared

604
based on a selection by a user of the user device of the selectable option, receive a plurality of location coordinates from the user device at a plurality of respective times, each respective location coordinate describing a respective location of the user device at its respective time

606
compute an estimated location of the water vessel based on the plurality of location coordinates and an elapsed time between a current time and a time at which a last-received location coordinate was received

608
Transmit the estimated location to a responder device

652
transmit a Short Message Service (SMS) message to a user device on a water vessel, the SMS message comprising a selectable option that, when selected, causes a location of the user device to be shared

654
based on a selection by a user of the user device of the selectable option, receive a plurality of location coordinates from the user device at a plurality of respective times, each respective location coordinate describing a respective location of the user device at its respective time

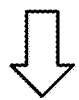

656
select a responder unit to assign to the user based on the plurality of location coordinates and a location of each of a plurality of candidate responder units

658
transmit location information to a responder device of the selected responder unit, the location information based on the plurality of location coordinates

*FIG. 6B*

SYSTEM FOR ACCURATE LOCATION ESTIMATION OF A WATER VESSEL

TECHNICAL FIELD

The disclosure generally relates to the field of locating a water vessel, and more specifically relates to near shore location tracking a water vessel.

BACKGROUND

While it is possible to locate users on land with a high level of accuracy, this is thanks to the benefit of multiple systems that work together to triangulate location, such as Global Positioning System (GPS), mobile cell towers, and additional sensors. This level of accuracy cannot be achieved off-shore because these systems do not exist off-shore. In order to have their locations tracked, larger water vessels have dedicated location technology that triggers a location to be sent via satellite to a tracking tool periodically. However, these location tracking mechanisms are computationally and practically expensive, and thus locations are sent infrequently (e.g., every 15 minutes). Moreover, smaller water vessels typically do not have dedicated tracking technology due to their expense. This results in a hampered ability to find users who may be in distress, thus resulting in failed rescue efforts where a distressed mariner cannot be found.

In modern times, most people, including mariners on board a water vessel, carry mobile phones that are capable of determining and transmitting location information when within cell phone range (e.g., within twenty miles from shore). However, when rescue is needed, even if a water vessel is within cell phone range, a mariner does not know how to contact an agency responsible for rescuing distressed mariners (e.g., the United States Coast Guard). This is because, unlike land rescue, where dialing 911 in the United States (and similar numbers globally) is well known to connect a user to a local law enforcement agency, there is no established system for water rescue. This lack of infrastructure additionally contributes to failed rescue efforts for distressed mariners. Even if a distressed mariner could figure out how to connect to a rescue agency, the rescue agency may have no means of locating the mariner because the rescue agency may have no means of acquiring the mariner's location. Moreover, the mariner may leave communications coverage (e.g., as a current carries the water vessel out of range), leaving the rescue agency with no recourse to contact the mariner.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6A depicts a process for enabling accurate estimation of a location of a water vessel, in accordance with an embodiment.

FIG. 6B depicts a process for enabling assignment of a responder unit to a user on a water vessel, in accordance with an embodiment.

DETAILED DESCRIPTION

Figure 1:
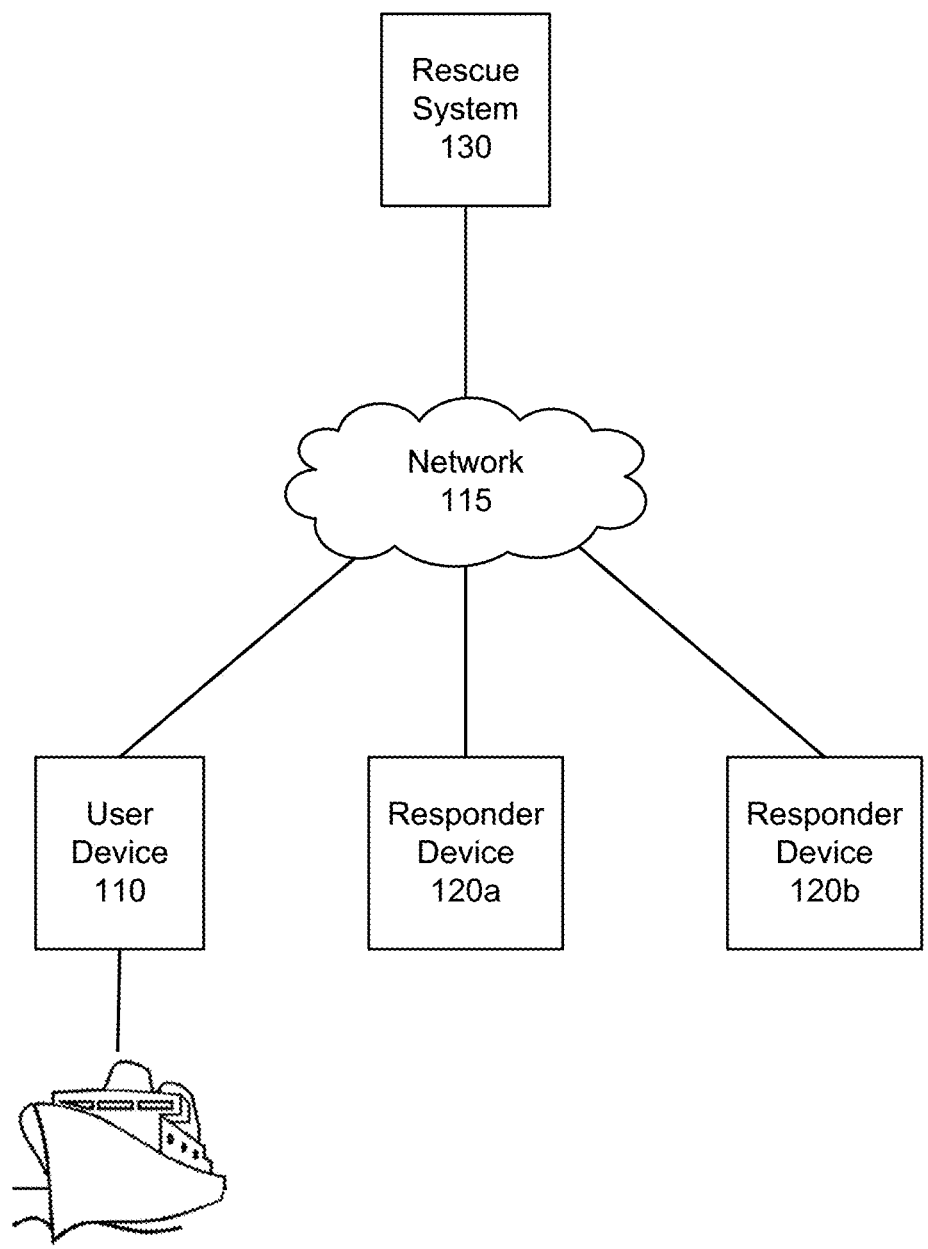
FIG. 1 illustrates one embodiment of a network environment for components of a rescue system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120a" indicates the text refers specifically to the element having that particular reference numeral. A reference numeral in the text without a following letter, such as "120" refers to any or all of the elements in the figures bearing that reference numeral (e.g., "120" in the text refers to reference numerals "120a" and/or "120b" in the figures). The term "real-time" in the text is used merely for convenience, and could encompass substantially real-time (i.e., within a threshold amount of time of the event occurring). The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an embodiment, a dedicated number for receiving a simple message service (SMS) message from a distressed mariner (e.g., "20911") may be used to initiate rescue proceedings for the mariner. SMS messages are useful in such situations because they require less data than other forms of communication and can be successfully transmitted and received even with a poor connection. An authorization link may be sent by a rescue agency in an SMS message responsive to a distress message, the authorization link enabling location sharing from the mariner's mobile device, even where a poor connection exists. Where location sharing ends because a mariner goes dark (e.g., boat of the distressed mariner drifts out of a communication range or the mariner's device fails), the systems and methods disclosed herein are able to find the right rescue agency, and to predict where the boat may be based on the location data points already received from the distressed mariner and perhaps other environmental factors (e.g., current and weather information).

One embodiment of a disclosed system, method and computer readable storage medium includes enabling accurate estimation of a location of a water vessel. The rescue system transmits a Short Message Service (SMS) message to a user device on the water vessel, the SMS message including a selectable option that, when selected, causes a location of the user device to be shared. Based on a selection by a user of the user device of the selectable option, the system receives a plurality of location coordinates from the user device at a plurality of respective times, each respective location coordinate describing a respective location of the user device at its respective time. The system computes an estimated location of the water vessel based on the plurality of location coordinates and an elapsed time between a current time and a time at which a last-received location coordinate was received. The system transmits the estimated location to a responder device.

In an embodiment of the disclosed system, method and computer readable storage medium includes enabling assignment of a responder unit to a user on a water vessel. The rescue system transmits a Short Message Service (SMS) message to a user device on the water vessel, the SMS message comprising a selectable option that, when selected, causes a location of the user device to be shared. Based on a selection by a user of the user device of the selectable option, the system receives a plurality of location coordinates from the user device at a plurality of respective times, each respective location coordinate describing a respective location of the user device at its respective time. The system selects a responder unit to assign to the user based on the plurality of location coordinates and a location of each of a plurality of candidate responder units. The system transmits location information to a responder device of the selected responder unit, the location information based on the plurality of location coordinates.

Rescue System Environment

Figure (FIG. 1 illustrates one embodiment of a network environment for components of a rescue system. Environment 100 includes user device 110, network 115, responder devices 120, and rescue system 130. The user device 110 and responder devices 120 may be referred to as client devices. Though there is only one user device 110 and two responder devices 120a and 120b shown in FIG. 1, other embodiments may use a different number of client devices of either type. These various components are now described in additional detail.

User device 110 is a client device of a user of a water vessel. A water vessel refers to any vehicle used in water capable of transporting one or more persons. A water vessel may be engine powered (e.g., motorboat), may be propelled partly or entirely by sails (e.g., sailboat), or unpowered or man-powered (e.g., raft, kayak, etc.). Responder device 120 is a client device associated with a responder unit. A responder unit refers to an organized group of persons (e.g., first responders trained to respond to an emergency) which services a particular area (e.g., different coast guard stations). The term client device refers to a computing device such as a mobile phone (e.g., cellular phone, smartphone), tablet, laptop, computer, or any other device that can interact with the rescue system 130 over network 115 consistent with the interactions described herein for the type of the client device.

Network 115 may be any suitable communications network for data transmission. In an embodiment such as that illustrated in FIG. 1, network 115 uses standard communications technologies and/or protocols and can include the Internet. In another embodiment, the entities use custom and/or dedicated data communications technologies. Network 115 connects user device 110 and responder devices 120 (or any number of client devices, in other embodiments) to the rescue system 130 such that the user device 110, the responder devices 120, and rescue system 130 can transmit data back and forth. Although not shown, the network 115 may also connect any other third party device that may transmit information to the rescue system 130 which could be used by the rescue system 130 in relation to the user device 110 and the responder device 130. For example, a third party device may transmit user information (e.g., phone number, etc.) associated with the user of the user device 110, or additional information about the current environmental conditions surrounding the user device 110 or about location information of the user device 110 to help location estimation.

Rescue system 130 facilitates activity relating to accurately estimating a location of the user device 110 on the water vessel and assigning a responder unit of a responder device to the user of the user device. Further details relating to such activities are described throughout with reference to FIGS. 2-9 below.

Rescue System Configuration

Figure 2:
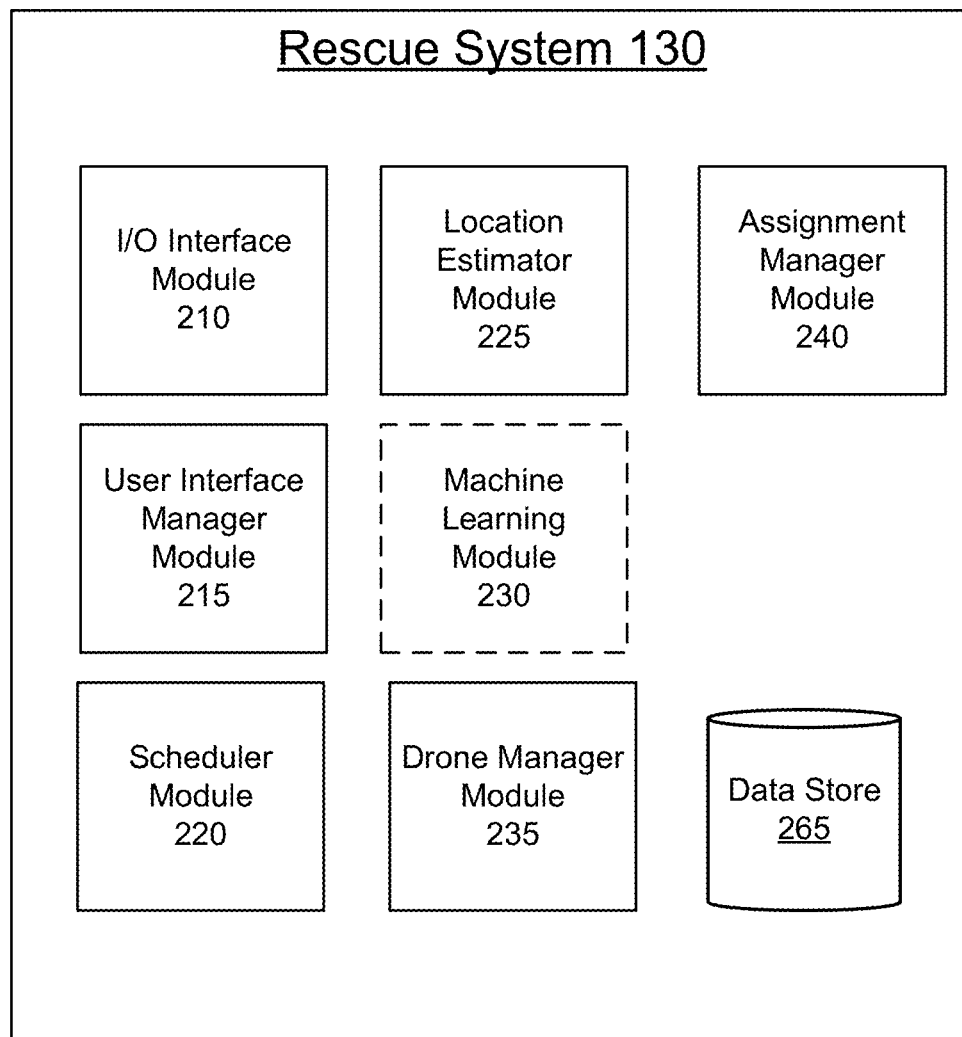
FIG. 2 illustrates one embodiment of modules and a database used by a rescue system.

FIG. 2 illustrates one embodiment of modules and a database used by a rescue system. Rescue system 130 includes I/O interface module 210, the user interface manager module 215, scheduler module 220, location estimator module 225, machine learning module 230, drone manager module 235, assignment manager module 240, and data store 265. The modules and databases depicted with respect to rescue system 130 are merely exemplary; fewer or more modules or databases may be used to effect the processes described herein.

The I/O (input/output) interface module 210 interfaces with the network to communicate with the user device 110 and the responder devices 120. The I/O interface 210 module transmits information to and receives information from the client devices. The information may be a Short Message Service (SMS) message, a plurality of location coordinates from client devices, a web page from the rescue system 130, or instructions for a drone.

The user interface manager module 215 generates information for display on a client device. The information may be information in an SMS message (e.g., FIG. 7A) or a web page (e.g., FIGS. 7B-C) for display on a user device 110. The information may be information in a web page for display on a responder device 120 (e.g., FIG. 8).

The scheduler module 220 schedules when an estimated location should be computed. For example, where a location of a water vessel is received due to a user sharing a location of their mobile device, there is no need to estimate a location because an actual location is received. However, if the data connection lapses for some time, the location of the water vessel may need to be estimated. The scheduler module 220 may compute an elapsed time between a current time and a time at which a last-received location coordinate was received by the rescue system 130. If the elapsed time exceeds a threshold amount of time, the scheduler module 220 may trigger the location estimator module 225 to estimate a location of the user device 110. The threshold time indicates when an updated estimated location of the water vessel should be computed. The threshold time may be a predetermined setting. For example, it may be a typical situation that a user device 110 begins transmitting its location information in real-time or substantially real-time (e.g., every few seconds), and the threshold time may be set to a small interval (e.g., couple of seconds, a minute) as a default setting.

In some embodiments, the scheduler module 220 may determine a threshold time based on a frequency of receiving the location coordinates. For example, the rescue system 130 may be programmed to estimate and provide an updated location responsive to determining that the user device 110 has stopped transmitting location information. In one scenario, a mobile device of a user may be programmed to share its location information responsive to detecting a movement or change in location of a boat. The boat may be disabled and in an area without much current or wind so the boat location does not change frequently. In this scenario, the mobile device would be sharing its location less frequently, and the scheduler module 220 may determine a threshold time based on the frequency that location information is received (e.g., if receiving location information once every ten minutes, set threshold time to a time greater than ten minutes). However, if wind or current has picked up and causes the boat to move at a moderate pace, the mobile device begins transmitting location information more frequently, but less than real-time. In this scenario, the scheduler 220 may adjust the threshold time according to the updated frequency of receiving location information (e.g., if receiving location information once a minute, set threshold time to be greater or equal to one minute). Continuing with this example, a determined threshold time may be one minute. The rescue system 130 may receive location coordinates at 2:15 pm, 2:16 pm, . . . to 2:32 pm, and then not receive additional location coordinates. At 2:34 pm, the scheduler module 220 determines an elapsed time as being 2 minutes (current time 2:34 pm minus the last received message at 2:32 pm) and triggers the location estimator module 225 to compute an estimated location of the user device 110 as the elapsed time is greater than the one minute threshold time.

In some embodiments, the scheduler module 220 may compute a threshold time based on a determined speed of the water vessel or environmental factors. Environmental factors may include measured data of the environment surrounding the user device 110 such as wind or current speed and direction which could affect the motion of a water vessel. In one example, the mobile device of a user on a boat may be transmitting its location coordinates in real-time and suddenly go dark (e.g., stop transmitting its location coordinates). If the boat is disabled (e.g., speed is slow or nonexistent) and there is little wind or current, there may not be a need to immediately estimate an updated location of the boat. The threshold time may be set to a higher value than a few seconds or minutes (e.g., default setting or based on frequency of received location information). The scheduler module 220 may determine or adjust the threshold value accordingly. The scheduler module 220 may set a threshold time to a higher value for a user device 110 on a water vessel with a slower speed than one with a faster speed. Continuing with the example of the disabled boat, if the rescue system 130 receives information about environmental factors that a wind or a current speed has increased, there may be a need to estimate a location of the boat sooner than later as it is likely the boat's position has changed. The scheduler module 220 may determine or adjust the threshold value accordingly. The scheduler module 220 may set a threshold time to a lower value for a user device 110 on a water vessel with a higher current or wind speed than one with a lower current or wind speed.

The location estimator module 225 estimates a location of the water vessel based on the plurality of location coordinates from the user device 110. The location estimator module 225 may determine a speed and a direction of the water vessel from the location coordinates and compute an estimated distance traveled (speed×elapsed time from last-received location coordinate) in the determined direction. The speed and the direction of the water vessel may also be based on one or more environmental factors such as a current (water) speed and direction measurement or a wind speed and direction measurement. For example, the water vessel may drift due to the water current and wind, and an estimated speed of the water vessel may be based on measured current speed/direction and a measured wind speed/direction. The location estimator module 225 may input the plurality of location coordinates and/or the one or more environmental factors into a machine learning model 230 and receive an estimated location of the water vessel as an output from the machine learning module 230. The location estimator module 225 may estimate the location of the water vessel at a current time or at a future time.

In some embodiments, the location may be estimated by using machine learning. The rescue system 130 optionally includes a machine learning model 230. The machine learning model 230 may be trained using historical data collected by the rescue system 130. For example, the rescue system 130 may have access to historical data due to previous rescue efforts, of received location information from user devices, additional location information, environmental factors, and actual location of user devices after a responder has reached the water vessel. This information can be used to train the machine learning model 230 to output a probability that the user device 110 is at each of a set of several coordinates (or within a range or radius of a given coordinate). The machine learning module 230 may be used by the location estimator module 225 to generate a projected location based on inputs such as a plurality of location coordinates from the user device 110, other additional location information, and one or more environmental factors. For example, the output of the machine learning module 230 may be a probability that the user device 110 is at each of a set of several location coordinates, and the location estimator module 225 may use this output to determine an estimated location and an uncertainty radius which indicates a field that the mariner is likely within. The location estimator module 225 may select an estimated location coordinate from the set of several location coordinates, the estimated location coordinate having the highest probability among the set, and determine an uncertainty radius based on the corresponding probability (e.g., lower probability would correspond to a higher uncertainty radius).

In some embodiments, unmanned vehicles (e.g., unmanned aerial or water vehicles, collectively referred to as "drones") may be used to aid rescue efforts, where drones are sent ahead of manned rescue vehicles to confirm a location of a distressed mariner. For example, a drone can go over the scene a broadcast captured images or video from the scene so the responder has more information about the scene. A drone may have infrared sensing capabilities to pick up heat signature of a user in a water vessel to locate the user device 110. The drone can fly by a certain perimeter of the scene to look for an infrared signal, and the drone can transmit a message responsive to finding an infrared signal to indicate the user device 110 has been located. The drone manager module 235 generates instructions for a drone. The instructions may include to launch a drone to a target destination and to scan a radius from the target destination.

The target destination may be an estimated location of the user device 110 at a future projected time. For example, the location of the user device 110 on a water vessel may change from the time a drone is launched to the time it reaches its target destination. the drone manager module 235 may request from the location estimator module 225 to estimate a location of the user device 110 at a future projected time based on the travel time for a drone to travel to a target destination. The location estimator module 225 may predict the location of the user device 110 at a future time based on the expected travel time of the drone (e.g., determined by speed, flight path) to reach its destination. The target destination may be a last-received location coordinate of the user device 110 or an estimated location of the user device 110. The drone manager module 235 may generate additional instructions for a drone to update the target destination as a location of the user device 110 as the location changes with time.

In one embodiment, the rescue system 130 may receive additional data that indicating the user device 110 is within a threshold distance of a mobile cell tower. For example, the mobile cell tower may be a created cell tower on a responder water vessel. The created cell tower may indicate to the rescue system 130 that the responder water vessel received a ping from a mobile device of the user, and the rescue system 130 may determine that the mobile device is within a threshold distance that is the reach of the created cell tower. The created cell tower may have additional information, such as a signal strength of the mobile device to the created cell tower. In this scenario, the rescue system 130 may determine the mobile device to be within a threshold distance based on the signal strength (e.g., stronger signal strength indicates mobile device is closer to created cell tower). The drone manager module 235 may generate instructions to launch a drone to the location of the mobile cell tower and for the drone to scan an area within the threshold distance of the mobile cell tower.

The assignment manager module 240 assigns a responder unit of a responder device 120 to a user of the user device 110. The assignment manager module 240 selects the responder unit to assign to the user based on the plurality of location coordinates from the user device 110 and a location of each of a plurality of candidate responder unit. The location of the candidate responder unit may be based on a fixed address of a corresponding headquarters of the responder unit. The location of the candidate responder unit may be based on received location coordinates from a corresponding responder device 120 of the candidate responder unit. For example, the assignment manager module 240 may select the responder unit closest to the location coordinates of the user device 110 based either on the location of the responder unit's headquarters or a received location from a responder device 120 (e.g., mobile phone of a first responder on duty) of the responder unit. The assignment manager module 240 may store an association of the user device 110 and the assigned responder device 120 in the data store 265. The assignment manager module 240 may establish a communication channel between the responder device to the user device. Responsive to the rescue system 130 receiving future communications from the user device 110, the assignment manager module 240 may reestablish the communication channel to the responder device 120 based on the association. In one embodiment, the assignment manager module 240 may assign a responder unit to a user based on location information (e.g., entered location coordinates, city and/or state, proximity to a known location, etc.) provided from a user of the user device 110 from SMS messages, text input in a textbox on a mobile browser, or from oral responses of a user from a phone call, etc.

The data store 265 stores information used by the rescue system 130. The information may include a plurality of responder units, corresponding addresses, and corresponding phone numbers or virtual addresses for communicating with devices or accounts of responders and/or responder units. The information may include an association between the user device 110 and a responder device 120 of a selected responder unit.

Figure 3:
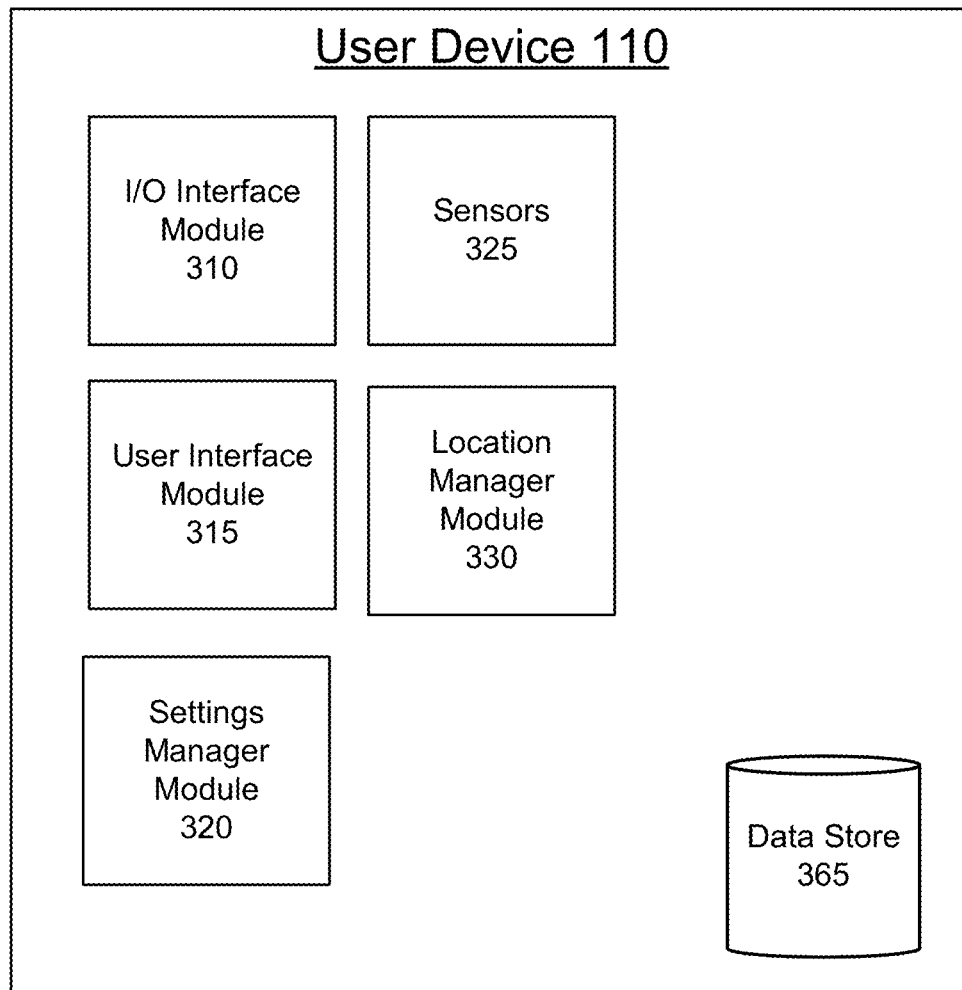
FIG. 3 illustrates one embodiment of modules and a database used by a user device.

FIG. 3 illustrates one embodiment of modules and database used by a user device. User device 110 includes I/O interface module 310, the user interface manager module 315, settings manager module 320, sensors 325, location manager module 330, and data store 365. The modules and databases depicted with respect to user device 110 are merely exemplary; fewer or more modules or databases may be used to effect the processes described herein.

The I/O interface module 310 interfaces with the network 115 to communicate with the rescue system 130 and optionally the responder device 120. The I/O interface module 310 can transmit information to and receive information from the rescue system 130 and the responder device 120. The information may be a Short Message Service (SMS) message, a plurality of location coordinates from the user device 110, or a web page from the rescue system 130.

The user interface manager module 315 presents information on the user device 110. In some embodiments, the user interface manager module 315 presents on a user device 110 an SMS message from the rescue system 130 with a selectable option requesting the user to share a location of the user device 110. For example, a mariner is in distress and texts a message "SOS" on his mobile device to a number (e.g., "20911"), and the rescue system 130 transmits the SMS to the mobile phone of the mariner. In some embodiments, the user interface module 315 presents an interface of a pre-installed application which includes a selectable option to share a location of the user. For example, prior to a mariner embarking on a water journey, the mariner installed an application his mobile device to use in the event he needs help on the water. The mariner launches the pre-installed an application once he is in distress, and the application interface includes a location share or distress button for the mariner to share his location. The user interface manager module 315 may present on a user device 110 a website of the rescue system 130. The website may include a graphical representation of the coast guard emblem.

The settings manager module 320 manages the settings for the user device 110. The settings manager module 320 may update a setting for the user device 110 to share location information responsive to a user selecting an option to share a location of the user device 110. The settings manager module 320 may enable a setting for the user device 110 to continually transmit location information, regardless of whether a confirmation response is received. The settings manager module 320 may enable a setting for the user device 110 to transmit location information responsive to the user device 110 determining a location of the user device 110 has changed (e.g., via the location manager 330). The settings manager module 320 may update a setting for the user device 110 to stop sharing location information responsive to a user selecting an option to stop sharing a location of the user device 110.

The sensors 325 detect at least one of motion, an environmental condition, position, or some combination thereof. The sensors 325 may include a motion sensor to detect motion, rotation, or acceleration. Examples of a motion sensor are an accelerometer, gravity sensor, gyroscope, or rotational vector sensors. The sensors 325 may include an environmental sensor to measure air pressure changes, humidity, temperature, etc. Examples of an environmental sensor are a barometer, photometer, or thermometer. The sensors 325 may include a position sensor such as a magnetometer to measure orientation of the device (e.g., true North). The user device 110 may transmit data captured by the sensors 325 (in addition to its location information) to the rescue system 130 when a share location option is selected by the user on the user device 110. The transmitted data captured from the sensors 325 can be used by the rescue system 130 as environmental factors (e.g., input to machine learning model, scheduling estimated location updates, estimating location).

The location manager module 330 determines a location of the user device 110. The location manager may determine a location of the user device using any location mechanisms available to the user device 110 such as GPS, Assisted GPS (AGPS), Wi-Fi, and cellular location. The location manager module 330 may use a network infrastructure of the user device 110 to determine the location of the user device 110. For example, the user device 110 may be a mobile phone which sends signals to nearby cell towers that can be used to triangulate the location of the mobile phone. The location manager module 330 may use GPS to determine the location of the user device 110. For example, if a mobile phone is equipped with GPS it can connect with GPS satellites to determine its location. The location manager module 330 may also determine the location using information from the sensors 325.

The data store 365 stores information for the user device 110. This information may include device settings of the user device 110.

Figure 4:
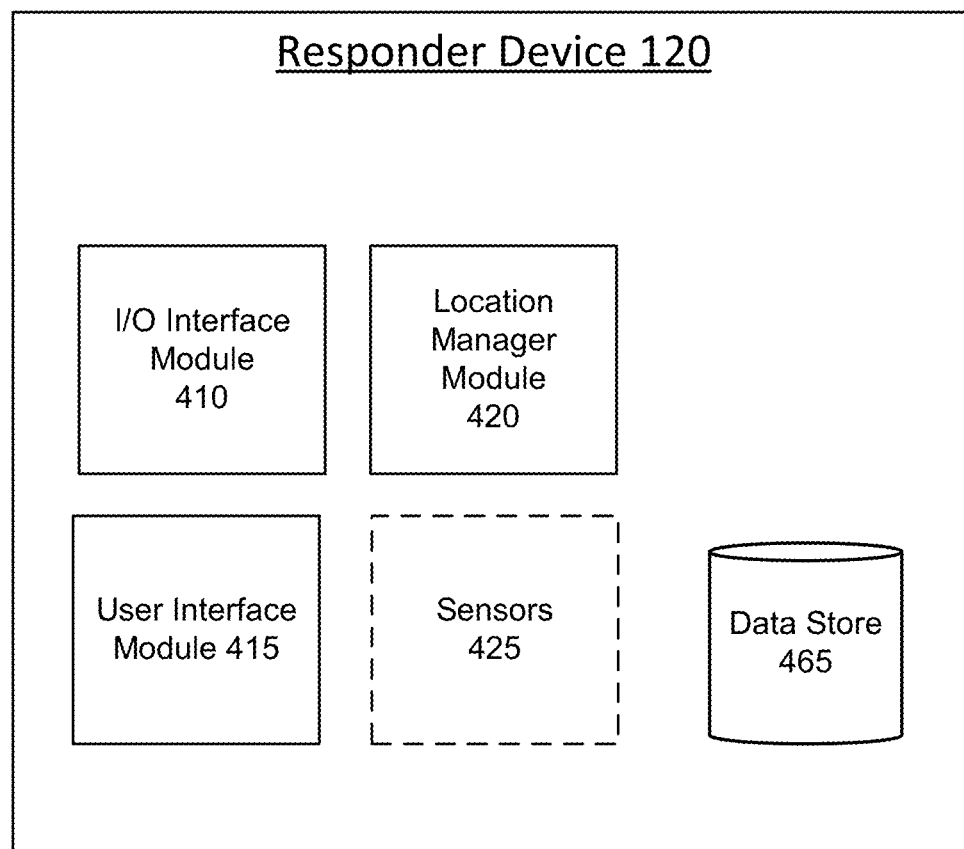
FIG. 4 illustrates one embodiment of modules and a database used by a responder device.

FIG. 4 illustrates one embodiment of modules and database used by a responder device. Responder device 120 includes I/O interface module 410, the user interface manager module 415, location manager module 420, sensors 425, and data store 465. The data store 465 stores information used by the responder device 120. The modules and databases depicted with respect to responder device 120 are merely exemplary; fewer or more modules or databases may be used to effect the processes described herein.

The I/O interface module 410 interfaces with the network 115 to communicate with the rescue system 130 and optionally the user device 110. The I/O interface module 410 can transmit information to and receive information from the rescue system 130 and the user device 110. The information may be a Short Message Service (SMS) message, a plurality of location coordinates from the user device 110, a plurality of location coordinates from the responder device 120, a web page from the rescue system 130, or instructions for a drone.

The user interface manager module 415 presents information on the responder device 120. The user interface module 415 may be similar to the user interface module 315 except it is for a responder device 120.

The location manager module 420 determines a location of the responder device 120. The location manager module 420 may be similar to the location manager module 330 of the user device 110 except it is for the responder device 120.

The responder device 120 may include sensors 425. In one example, the responder device 120 is a mobile phone, the sensors 425 are similar to the sensors 325 of the user device 110 except they are for the responder device 120.

Computing Machine Architecture

Figure 5:
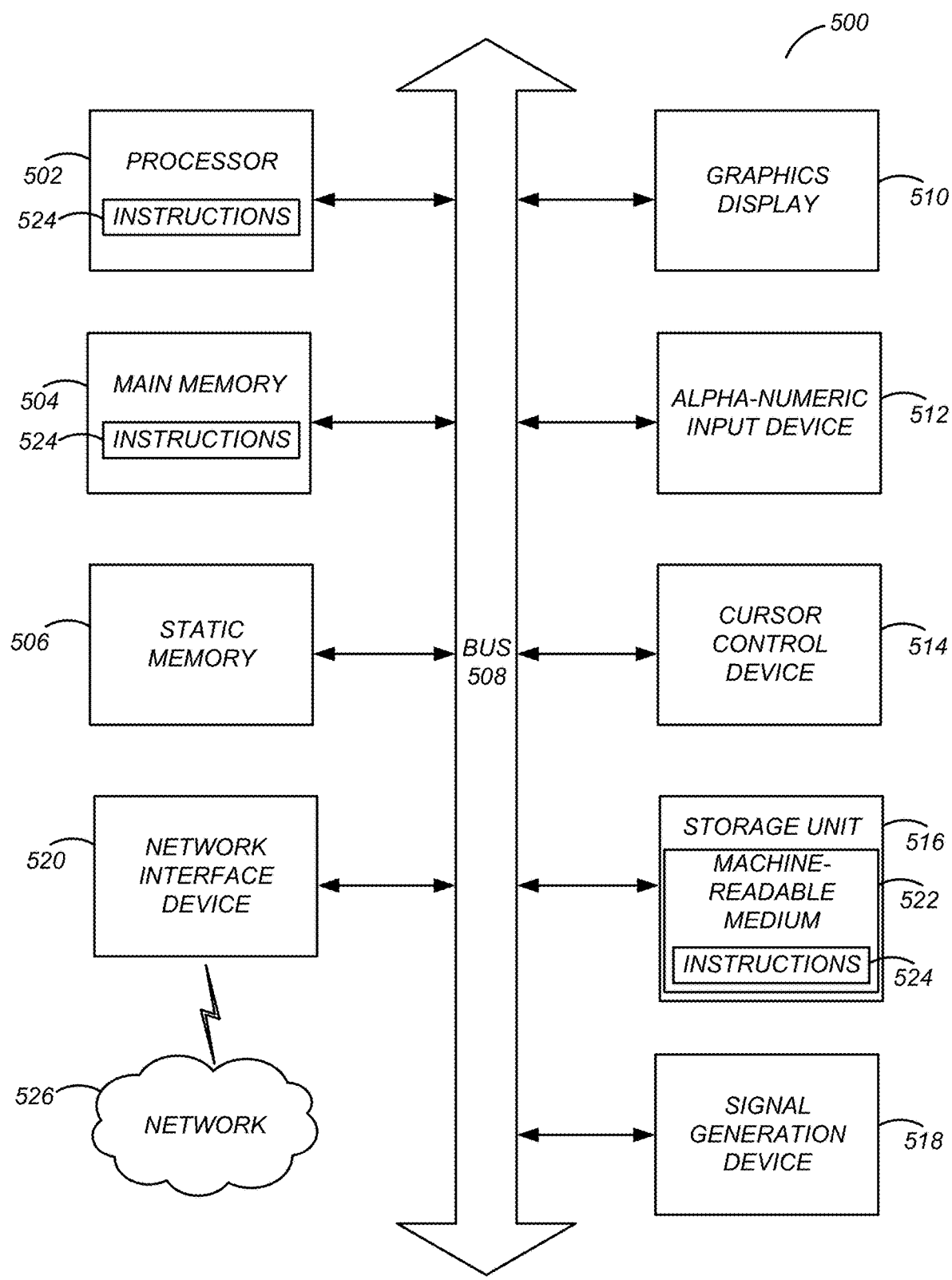
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alpha-numeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Example Use Case—Accurate Estimation of a Location of a Water Vessel

The above-described components of the rescue system 130 enable a system to accurately estimate a location of a water vessel. In one example, the responder is made aware that a water vessel is in distress and obtains a phone number of a person on the water vessel. For example, a responder receives a notification that a person (e.g., user associated with a user device) on a water vessel is in distress (e.g., phone call from the user or from friends or family of the user). The responder navigates to a website of the rescue system 130 via a responder device 120 and logs in to the website of the rescue system 130 with credentials (e.g., email and password). The rescue system 130 transmits, to the responder device 120, instructions to display a request for a phone number of the user in distress along with a selectable option to locate the device associated with the phone number of the user. The responder device 120 may present the request in a web browser as a web page including a single input field for a mobile phone number along with a locate button in a user interface. The responder can enter the user's phone number into the field and press the locate button on the user interface of the responder device 120. Responsive to the rescue system 130 receiving the user's phone number from the responder device 120, the rescue system 130 transmits an SMS message for display on the user device 110 of the user from a 5-digit short code or 10-digit long code. In a different example, the SMS message may be transmitted responsive to a user's direct request for help to the rescue system 130 (e.g., user texts "SOS" to a rescue number such as "20911"). For example, the water vessel may have a reflective sticker by the steering wheel on the water vessel indicating that in case of an emergency, tune to a particular VHF channel or text 20911. In another example, the SMS message may be transmitted responsive to the rescue system 130 determining the user may need assistance based on earlier received information about the user. For example, the user pre-registers his phone number with a rental boat company for a scheduled time, and the information is received by the rescue system 130 (e.g., information is sent by the boat company or user device 110). The rescue system 130 may determine that the user does not return the rental boat on time and automatically transmit the SMS message to the user's mobile device to ask if the user is ok, and if not, to select a link (e.g., launch web page, to share location). The use of an SMS message is non-limiting, and the rescue system 130 may communicate this information with the user device 110 by other means, such as email, data messaging systems, or other applications, etc.

FIG. 6A depicts a process for enabling accurate estimation of a location of a water vessel, in accordance with an embodiment. Process 600 begins with rescue system 130 transmitting 602 an SMS message to a user device 110 on a water vessel, the SMS message comprising a selectable option that, when selected, causes a location of the user device 110 to be shared. For example, the user device 110 is a mobile phone, and the SMS message includes a link to launch a URL in a mobile browser. After tapping the link, the user may be presented with an additional prompt by a mobile browser of the user device 110 to consent to share device location. In some instances, the user may have disabled GPS or Location Services on their mobile device. The rescue system 130 detects the operating system (such as iOS or Android) via the website and transmits tailored instructions on how to enable location services on their particular user device 110. In some embodiments, GPS cannot be obtained from the phone (e.g., because the user does not enable location services), and the rescue system 130 may transmit instructions to the user device 110 for the user on how to enable GPS.

Based on a selection by a user of the user device 110 of the selectable option, the rescue system 130 receives 604 a plurality of location coordinates from the user device 110 at a plurality of respective times, each respective location coordinate describing a respective location of the user device 110 at its respective time. For example, after the user selects an option on the mobile browser of the user device 110 to allow the rescue system 130 to access the current location of the user device 110, the user device 110 transmits the location coordinates to the rescue system 130. The user device 110 may utilize all available location mechanisms available to it, such as GPS, AGPS, Wi-Fi, and cellular location to determine the location coordinates. The user device 110 may establish a web socket connection between the user's mobile browser of the user device 110 and the rescue system 130. The user device 110 may transmit location information in real-time (or near real-time) to the rescue system 130, or the user device 110 may transmit location coordinates when the user device 110 detects a change in position (e.g., multiple times per second, every few seconds, minutes, etc. when movement is detected by user device 110). The rescue system 130 receives the location coordinates from the user device 110 and may transmit the location coordinates to the responder device 120 to allow the responder to observe the real-time movement of the water vessel.

The rescue system 130 computes 606, an estimated location of the water vessel based on the plurality of location coordinates and an elapsed time between a current time and a time at which a last-received location coordinate was received. The rescue system 130 may determine the user device 110 has stopped transmitting location coordinates for more than a threshold period of time, and estimate a location of the user device 110 at a current time.

The rescue system 130 transmits 608 the estimated location to a responder device 120. The rescue system 130 may include instructions for displaying the estimated location on a map of a user interface on a responder device 120.

Example Use Case—Assignment of a Water Vessel to Responder Unit

The above-described components of the rescue system 130 enable assignment of a water vessel to a responder unit. In one example, the user device 110 may have transmitted a distress SMS message (e.g., text to "20911") comprising a payload including a symbol predefined as corresponding to a request for help (e.g., "SOS"). Responsive to receiving the distress SMS message from the user device 110, the rescue system 130 transmits an SMS for display on the user device 110 of the user from a 5-digit short code (e.g., "20911") or 10-digit long code. In some embodiments, the rescue system 130 may give the user an input option (e.g., launch text box in a mobile browser, or in SMS text) so that the user can input their location information and/or other information. The user may describe their location, for example, in the text box and submit the location information (e.g., hit send) to the responder device. The location information input from the user can be a latitude and longitude from the boat (e.g., user may enter in location coordinates from another GPS device on the water vessel), a descriptive indicator (e.g., ten miles west from a particular known geographical location). The user device 110 may be presented with a two way chat option to call a responder device 120 (e.g., a particular coast guard station, or a responder of a responder device 120), the two-way chat option including a text box for free-form typing. The responder device 120 may reply to the user device 110 that they received the location of the user, and that they are responding to the call or will be there in an estimated time. In some embodiments, the user may call or text a phone number to request help. The user may be presented by the rescue system 130 with a series of prompts or questions from a phone call or through text messaging, such as requesting the state that the user is closest to on the water vessel, and subsequently requesting the city that the user is closest to on his water vessel. These series of prompts/questions may provide information to narrow down which responder unit the user is closest to, and match the user device 110 to a responder unit (e.g., particular coast guard station, responder of a responder device). For example, the United States Coast Guard has different sector commands that covers different territories. The information provided by the user, such as a state and/or a city, may be enough information to locate the closest United States Coast Guard sector, to connect the user to the appropriate responder unit. In an embodiment, where the user device 110 calls a responder device 120, the responder device 120 may automatically detect an address (e.g., phone number) of user device 110 and may transmit an SMS message to the user device 110 that includes a prompt to share location with the responder device 120.

FIG. 6B depicts a process for enabling assignment of a responder unit to a user on a water vessel, in accordance with an embodiment. Process 650 begins with rescue system 130 transmitting 652 an SMS message to a user device 110 on a water vessel, the SMS message comprising a selectable option that, when selected, causes a location of the user device 110 to be shared. Based on a selection by a user of the user device 110 of the selectable option, the rescue system 130 receives 654 a plurality of location coordinates from the user device at a plurality of respective times, each respective location coordinate describing a respective location of the user device at its respective time. The rescue system 130 selects 656, a responder unit to assign to the user based on the plurality of location coordinates and a location of each of a plurality of candidate responder units. The rescue system 130 transmits 658 location information to a responder device 120 of the selected responder unit, the location information based on the plurality of location coordinates. The location information may be the plurality of location coordinates from the user device 110 or at least one of the plurality of location coordinates from the user device 110 (e.g., a last received location coordinate). The location information may be an estimated location of the user device 110. The rescue system 130 may determine the user device 110 has stopped transmitting location coordinates for more than a threshold period of time, and estimate a location of the user device 110 at a current time.

Responsive to the responder unit being assigned, the rescue system 130 may send a predetermined message to the user on behalf of the responder unit (e.g., "We've received your location. Help is on the way." or "Turn your VHF radio to Channel.") The rescue system 130 may provide a two-way chat interface to the responder over SMS and the user over SMS so the user device 110 and the responder device 120 can communicate over text. If a cellular voice connection is available, the rescue system 130 may provide the user with a link on a web page to dial the assigned responder via phone. The rescue system 130 may provide the responder device 120 with capability to receive the call via the web browser of the rescue system 130 on the responder device 120.

Example User Device Interface

Figure 7C:
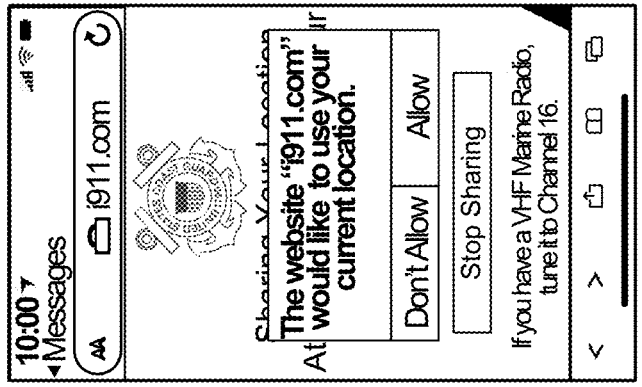
FIG. 7C depicts a pop up mobile browser user interface on a user device, in accordance with an embodiment.
Figure 7B:
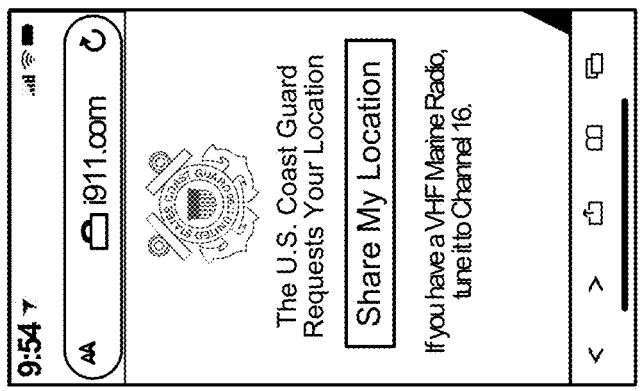
FIG. 7B depicts a mobile browser user interface on a user device, in accordance with an embodiment.
Figure 7A:
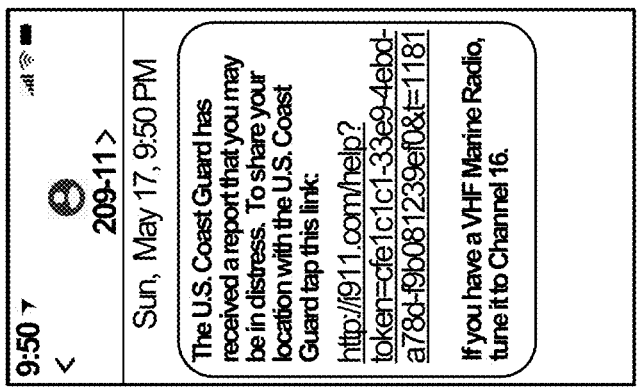
FIG. 7A depicts a message user interface on a user device, in accordance with an embodiment.

FIG. 7A depicts a message user interface on a user device, in accordance with an embodiment. The message user interface displays an SMS message on a user device 110 which is a mobile phone. The SMS message is from the rescue system 130 and includes a selectable option that, when selected, causes a location of the user device 110 to be shared. In this example, the selectable option is to open a link to share the user's location. The SMS message may include information such as a report was received that the user may be in distress, and instructions that if the user has a VHF Marine Radio, to tune it to a particular channel.

FIG. 7B depicts a mobile browser user interface on a user device, in accordance with an embodiment. The mobile browser interface displays a web page of the rescue system 130 to the user of the user device 110 which is a mobile phone. Continuing with the example of FIG. 7A, after the user selects (e.g., taps) the link, the user device 110 opens a mobile browser and navigates to a web page of the rescue system 130. The mobile browser includes a selectable option to share the user's location (e.g., "Share My Location" button).

FIG. 7C depicts a pop up user interface on the user device, in accordance with an embodiment. Continuing with the example of FIG. 7B, after the mobile browser navigates to the web page of the rescue system 130 and a user selects the selectable option on the web page, the user device 110 may launch a pop up user interface to indicate that the rescue system 130 would like access to the current location of the user device 110. In some embodiments, the pop up user interface may automatically launch after the mobile browser navigates to the web page without the user selecting the selectable option on the web page.

Example Responder Device Interface

Figure 8:
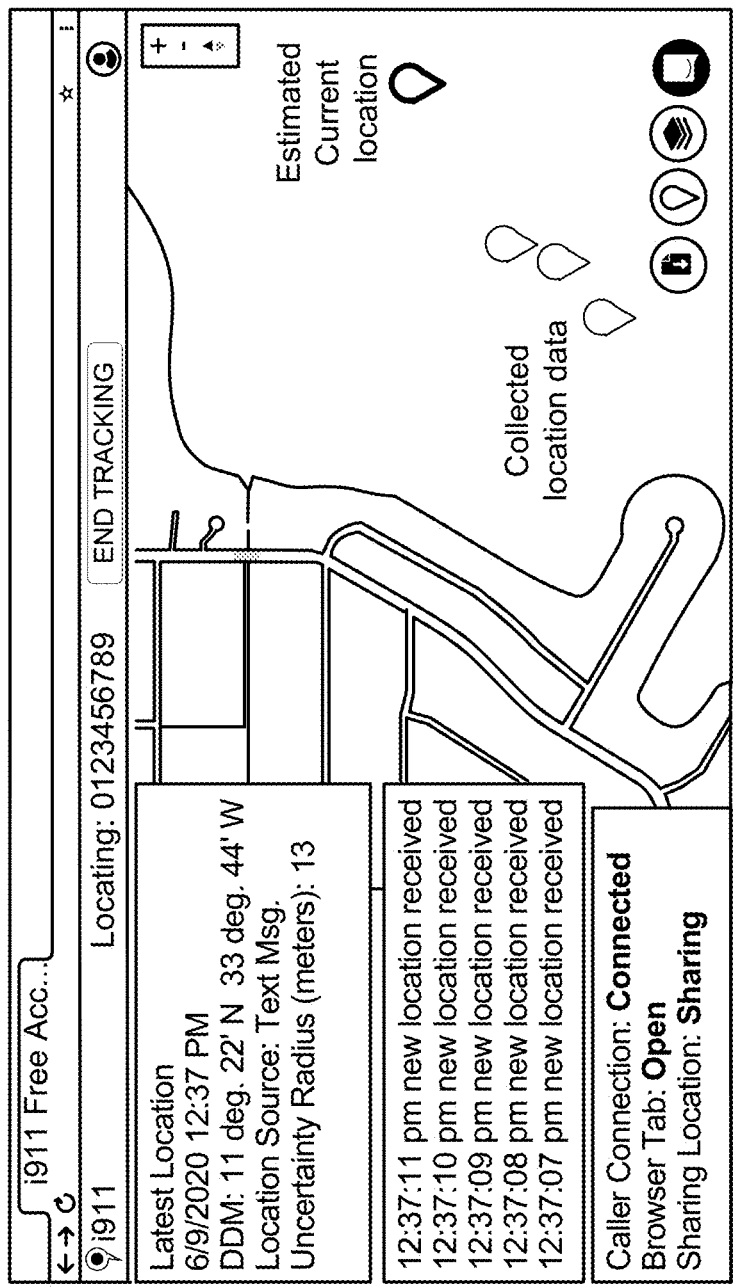
FIG. 8 depicts a user interface on a responder device, in accordance with an embodiment.

FIG. 8 depicts a user interface on the responder device, in accordance with an embodiment. The user interface may be a web browser of the responder device 120 which displays a web page of the rescue system 130. The user interface on the responder device 120 includes a map with the estimated location of the user device 110 marked on the map. The user interface may also include information on the latest location of the user device 110 in a format of Latitude/Longitude, Degrees/Minutes/Seconds (DMS), Decimal Degree Minutes (DDM), an uncertainty radius, information regarding a Date/Time stamp indicating locations as they are received by the rescue system 130, a phone status of the user (e.g., did user tap link to share location, is the user's mobile browser open, etc.), and an estimated location of the user device 110.

The rescue system 130 may transmit location coordinates from the user device 110 as they are received to the responder device 120 to allow real-time update of the location of the user device 110 on its user interface. The rescue system 130 may enable the responder device 120 to display multiple previously transmitted location coordinates from the user device 110 (e.g., collected location data), along with an estimated current location of the user device 110.

Example Assignment of Responder Unit to User

Figure 9:
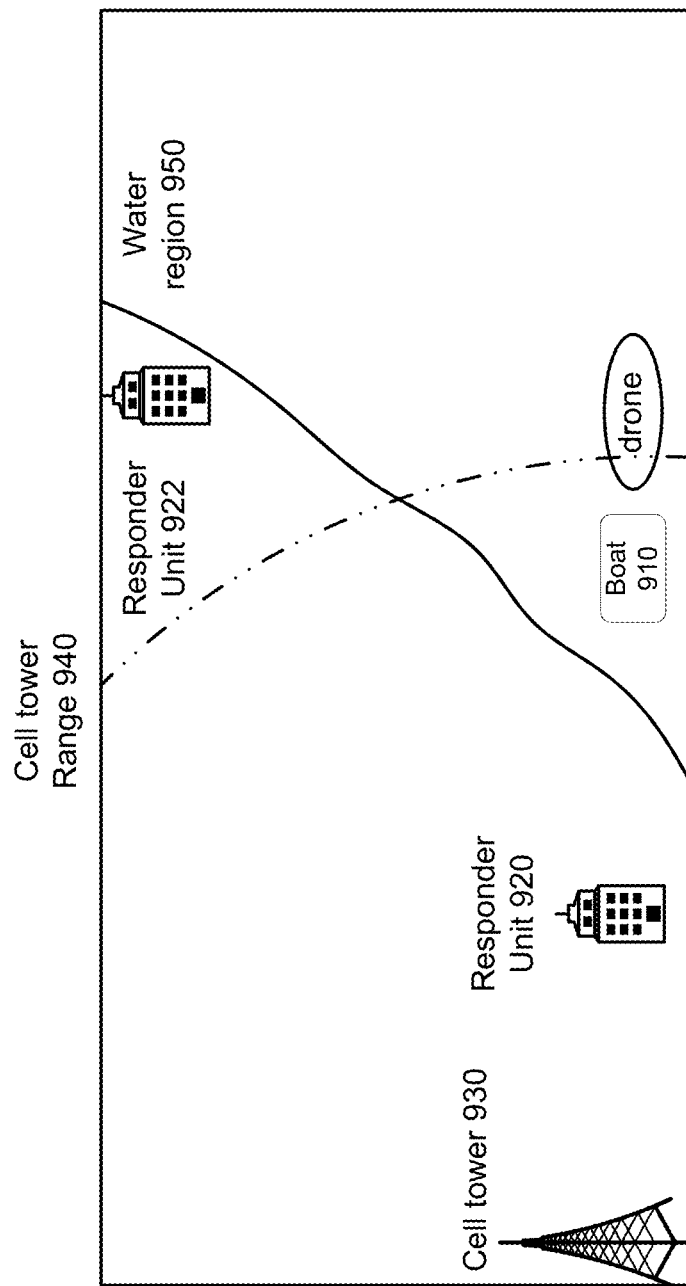
FIG. 9 depicts an assignment of a responder unit to a user on a water vessel, in accordance with an embodiment.

FIG. 9 depicts an assignment of a responder unit to a user on a water vessel, in accordance with an embodiment. A boat 910 has a passenger that is a user with a user device 110. A user device 110 transmits its location coordinates to a rescue system 130. The rescue system 130 determines that the location of the user device 110 is closer to an address of a responder unit 920 than the responder unit 922. The rescue system 130 assigns the user to the responder unit 920. The responder unit 920 has a corresponding phone number, and the rescue system 130 may connect the user directly with a dispatcher of the responder unit 920. In another example, responder devices 120 (e.g., mobile phones) are associated respectively with responder units 920 and 922. The responder devices 120 may transmit location coordinates that are received by the rescue system 130 which are used to assign the user in the boat 910 to a responder unit based on the received location coordinates of the responder device 120 that is closest to the boat 910.

Example Drone Use

The rescue system 130 may enable the responder 120 to launch a drone to a location or estimated location of the user device. For example, the rescue system 130 may transmit information to a responder device 120 to enable a responder to launch a drone. The information may be instructions for a user interface of a responder unit 120 to display a selectable option to launch a drone. The drone may be launched from a water vessel (e.g., boat of responder, other water vessel, etc.) or from shore. A technical advantage of being launched from a water vessel is that the drone may have a limited fly time because of battery constraints, and the water vessel may be closer to a location or estimated location of the user device. Moreover, resources in powering the drone are conserved where the responder unit 120 does not need to launch the drone (e.g., where the estimated location of the user device is accurate, and where the responder 120 thus found the boat 910 and did not need to launch the drone).

FIG. 9 also depicts an example use of a drone. A user device 110 in the boat 910 (e.g., water vessel) is within a threshold distance of the cell tower 930 (e.g., within cell tower range 940). In this example, the user device 110 cannot determine its own location coordinates to transmit to the cell tower 930, but the rescue system 130 determines that the user device 110 is within the threshold distance of the cell tower 930. The rescue system 130 may generate drone instructions for a drone to scan a target area (e.g., cell tower range 940, or a radius from the location of the cell tower 930) to locate the user device 110. Since a portion of the cell tower range 940 is in a water region 950 and the boat is in the water region 950, the rescue system 130 may further limit the scan area to be an area of the cell tower range 940 that overlaps with a water region 950.

In another example, a user device 110 in the boat 910 may be able to determine its location coordinates and transmit its location coordinates to be received by the rescue system 130. However, the boat 910 may later drift out of range of the cell tower 930 (e.g., outside cell tower range 940) and the rescue system 130 may no longer receive location coordinates transmitted from the user device 110. If the boat 910 drifts within a range of a mobile cell tower (e.g., created cell tower of a responder water vessel), the rescue system 130 may receive additional data associated with a location of the user device 110. The rescue system 130 may determine whether the additional data indicates the location of the user device 110 is within a threshold distance of a mobile cell tower of a responder water vessel. Responsive to determining the additional location data is within the threshold distance to the mobile cell tower of the responder water vessel, the rescue system 130 may transmit to the responder device 120 updated location information. The updated location information may be based on the received additional data which may comprise transmitted location coordinates of the user device 110. The updated location information may be an estimated location based on the received location coordinates of the user device 110 and may be additionally based on environmental factors.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling accurate estimation of a location of a water vessel and/or enabling assignment of a responder unit to a user through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for enabling accurate estimation of a location of a water vessel, the method comprising:
   transmitting a Short Message Service (SMS) message to a user device on the water vessel, the SMS message comprising a selectable option that, when selected, causes a location of the user device to be shared;
   based on a selection by a user of the user device of the selectable option, receiving a plurality of location coordinates from the user device at a plurality of respective times, each respective location coordinate describing a respective location of the user device at its respective time;
   computing an estimated location of the water vessel based on the plurality of location coordinates and an elapsed time between a current time and a time at which a last-received location coordinate was received; and
   transmitting the estimated location to a responder device.

2. The method of claim 1, wherein computing the estimated location of the water vessel is further based on one or more environmental factors comprising at least one of a current speed and direction measurement or a wind speed and direction measurement.

3. The method of claim 2, wherein computing the estimated location of the water vessel comprises:
   inputting the plurality of location coordinates and the one or more environmental factors into a machine learning model, the machine learning model trained to output information corresponding to a projected location based on its inputs; and
   generating the estimated location based on the information output by the machine learning model.

4. The method of claim 1, further comprising:
   computing a future projected location of the water vessel based on a travel time of a drone to the estimated location of the water vessel; and
   transmitting, to the responder device, drone information comprising instructions for a drone to go to the future projected location of the water vessel and to scan a radius from the future projected location of the water vessel to locate the user device.

5. The method of claim 4, further comprising:
   receiving information indicating a drone has located the user device, the information comprising one or more location coordinates of the drone at a corresponding time of locating the user device; and
   transmitting to the responder device an updated location coordinate of the user device based on the one or more location coordinates of the drone at the corresponding time of locating the user device.

6. The method of claim 1, further comprising:
   receiving additional data associated with a location of the user device;
   determining whether the additional data indicates the location of the user device is within a threshold distance of a mobile cell tower of a responder water vessel; and
   responsive to determining the additional location data is within the threshold distance to the mobile cell tower of the responder water vessel, transmitting, to the responder device, updated location information.

7. The method of claim 1, wherein the receiving of the plurality of location coordinates from the user device is based on the location coordinates being transmitted by the user device responsive to detecting a movement of the water vessel.

8. The method of claim 1, wherein the receiving of the plurality of location coordinates from the user device is based the location coordinates being transmitted by the user device regardless of whether an acknowledgement message is received by the user device.

9. A non-transitory computer-readable medium comprising instructions encoded thereon for enabling accurate estimation of a location of a water vessel, the instructions, when executed by one or more processors, causing the one or more processors to perform operations, the instructions comprising instructions to:
   transmit a Short Message Service (SMS) message to a user device on the water vessel, the SMS message comprising a selectable option that, when selected, causes a location of the user device to be shared;
   based on a selection by a user of the user device of the selectable option, receive a plurality of location coordinates from the user device at a plurality of respective times, each respective location coordinate describing a respective location of the user device at its respective time;
   compute an estimated location of the water vessel based on the plurality of location coordinates and an elapsed time between a current time and a time at which a last-received location coordinate was received; and
   transmit the estimated location to a responder device.

10. The non-transitory computer-readable medium of claim 9, wherein the instructions to compute an estimated location of the water vessel is further based on one or more environmental factors comprising at least one of a current speed and direction measurement or a wind speed and direction measurement.

11. The non-transitory computer-readable medium of claim 10, wherein the instructions to compute the estimated location further comprise instructions to:
   input the plurality of location coordinates and the one or more environmental factors into a machine learning model, the machine learning model trained to output information corresponding to a projected location based on its inputs; and generate the estimated location based on the information output by the machine learning model.

12. The non-transitory computer-readable medium of claim 10, wherein the instructions further comprise instructions to:

compute a future projected location of the water vessel based on a travel time of a drone to the estimated location of the water vessel; and transmit, to the responder device, drone information comprising instructions for a drone to go to the future projected location of the water vessel and to scan a radius from the future projected location of the water vessel to locate the user device.

13. The non-transitory computer-readable medium of claim 12, wherein the instructions further comprise instructions to:

receive information indicating a drone has located the user device, the information comprising one or more location coordinates of the drone at a corresponding time of locating the user device; and transmit to the responder device an updated location coordinate of the user device based on the one or more location coordinates of the drone at the corresponding time of locating the user device.

14. The non-transitory computer-readable medium of claim 9, wherein the instructions further comprise instructions to:

receive additional data associated with a location of the user device;

determine whether the additional data indicates the location of the user device is within a threshold distance of a mobile cell tower of a responder water vessel; and responsive to determining the additional location data is within the threshold distance to the mobile cell tower of the responder water vessel, transmitting, to the responder device, updated location information.

15. The non-transitory computer-readable medium of claim 9, wherein the instructions to receive the plurality of location coordinates from the user device is based on the location coordinates being transmitted by the user device responsive to detecting a movement of the water vessel.

16. The non-transitory computer-readable medium of claim 9, wherein the instructions to receive the plurality of location coordinates from the user device is based the location coordinates being transmitted by the user device regardless of whether an acknowledgement message is received by the user device.

17. A system for enabling accurate estimation of a location of a water vessel, the system comprising one or more processors that, when executing instructions, are caused to perform operations of:

transmitting a Short Message Service (SMS) message to a user device on the water vessel, the SMS message comprising a selectable option that, when selected, causes a location of the user device to be shared;

based on a selection by a user of the user device of the selectable option, receiving a plurality of location coordinates from the user device at a plurality of respective times, each respective location coordinate describing a respective location of the user device at its respective time;

computing an estimated location of the water vessel based on the plurality of location coordinates and an elapsed time between a current time and a time at which a last-received location coordinate was received; and transmitting the estimated location to a responder device.

18. The system of claim 17, wherein computing an estimated location of the water vessel is further based on one or more environmental factors comprising at least one of a current speed and direction measurement or a wind speed and direction measurement.

19. The system of claim 17, wherein the operations further comprise:

computing a future projected location of the water vessel based on a travel time of a drone to the estimated location of the water vessel; and transmitting, to the responder device, drone information comprising instructions for a drone to go to the future projected location of the water vessel and to scan a radius from the future projected location of the water vessel to locate the user device.

20. The system of claim 17, wherein the operations further comprise:

receiving additional data associated with a location of the user device;

determining whether the additional data indicates the location of the user device is within a threshold distance of a mobile cell tower of a responder water vessel; and responsive to determining the additional location data is within the threshold distance to the mobile cell tower of the responder water vessel, transmitting, to the responder device, updated location information.

* * * * *